Feb. 4, 1964 R. T. LYMAN 3,120,166
COOLING DUCT FOR CABINETS
Filed Nov. 16, 1961 2 Sheets-Sheet 1
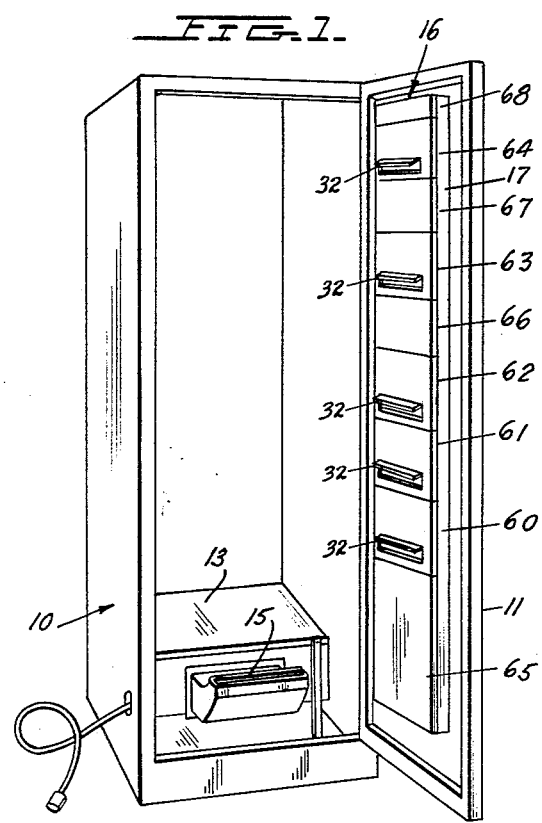
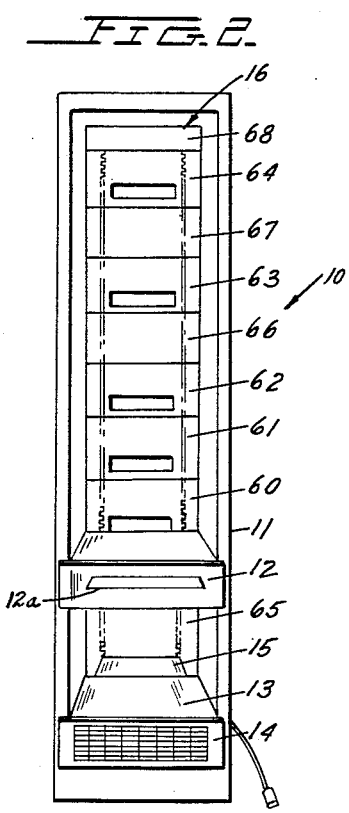
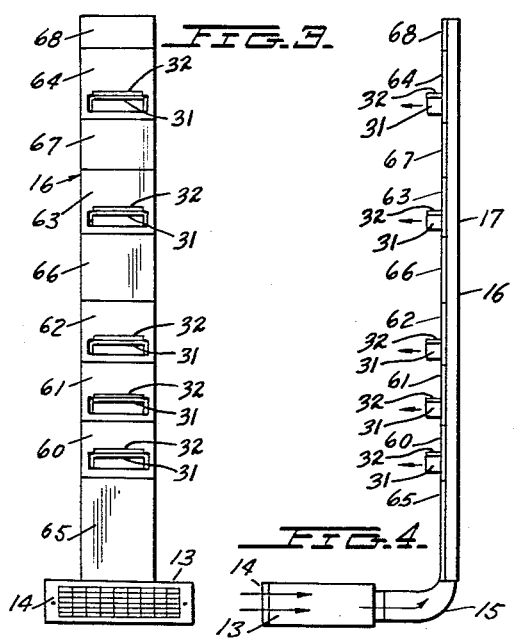
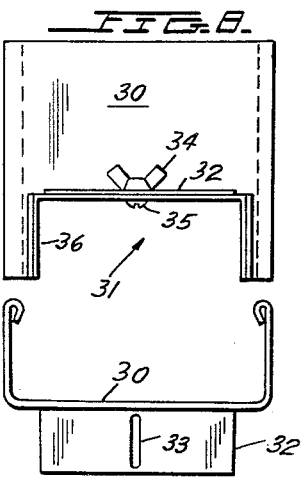
INVENTOR.
ROGER T. LYMAN
BY
OSTROLENK, FABER, GERB & SOFFEN
ATTORNEYS Feb. 4, 1964 R. T. LYMAN 3,120,166
COOLING DUCT FOR CABINETS
Filed Nov. 16, 1961 2 Sheets-Sheet 2
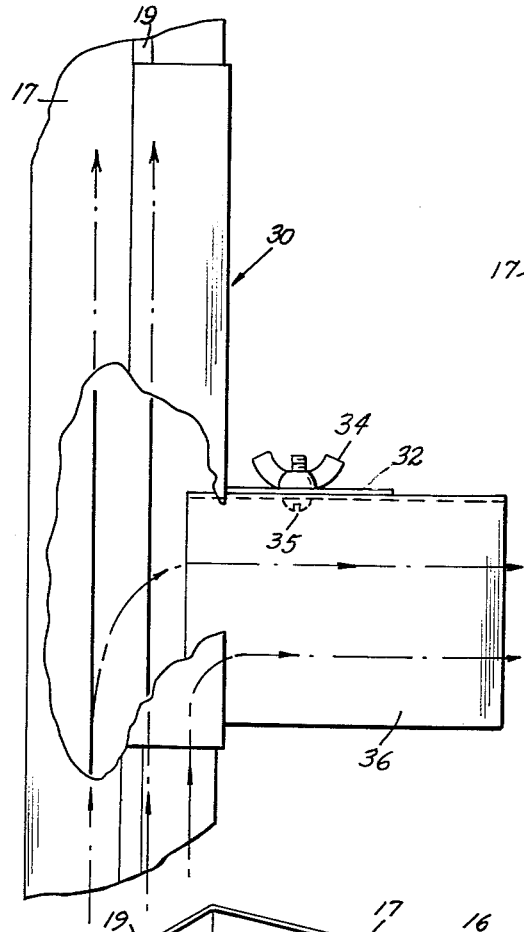
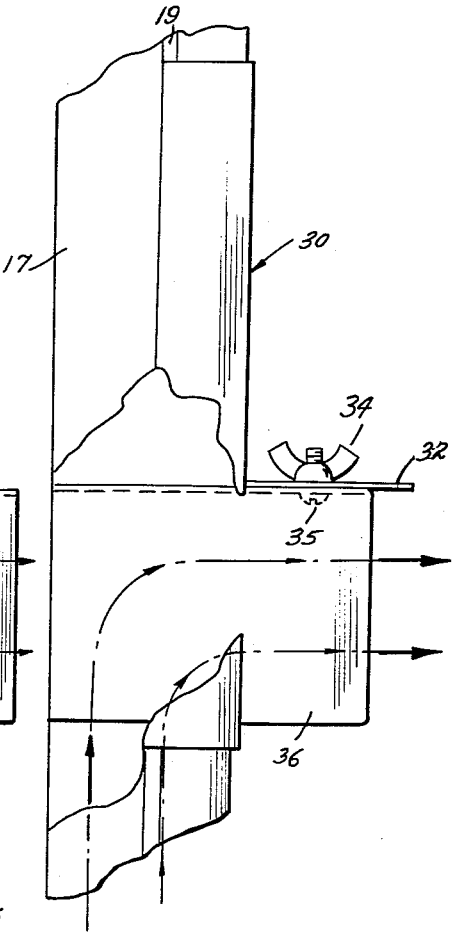
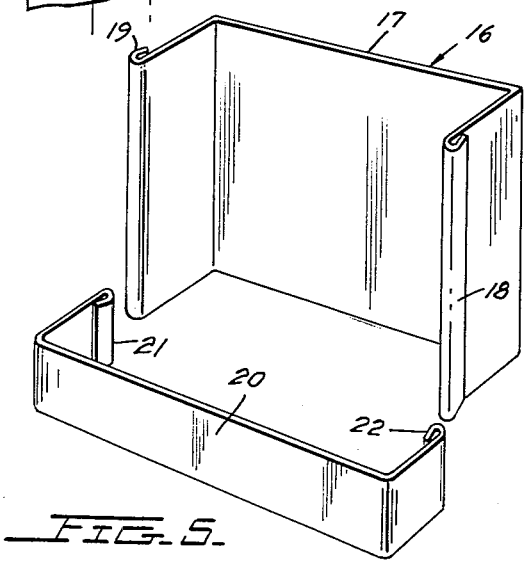
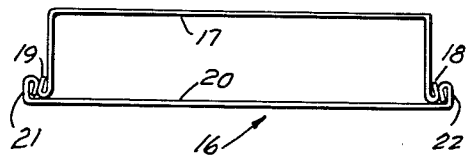
INVENTOR.
ROGER T. LYMAN
BY
OSTROLENK, FABER, GERB & SOFFEN
ATTORNEYS United States Patent Office 3,120,166
Patented Feb. 4, 1964

3,120,166
COOLING DUCT FOR CABINETS
Roger T. Lyman, Princeton, N.J., assignor to Kooltronic Fan Company, Princeton, N.J., a corporation of New Jersey
Filed Nov. 16, 1961, Ser. No. 152,760
3 Claims. (Cl. 98—39)

My invention relates to a novel duct construction for cabinets, and more specifically relates to a novel cooling duct arrangement for use with chassis for electronic equipment.

Enclosures for electronic equipment are commonly formed of tall steel housings which receive banks of electronic chassis each of which can be removed and replaced from the housing independently of other chassis, and are arranged vertically and on top of one another. In such standard arrangements, a cooling duct is commonly arranged to extend up one wall of the housing with appropriately located openings for cooling air to come out of the duct and blow across various associated racks of equipment.

In accordance with the present invention, I provide a novel duct which is formed of duct outlet sections which may be adjustably positioned at any desired point along the length of the duct, and blank sections which are each removable without tools. Moreover, I have provided a novel manner wherein the duct may be mounted on the cabinet door which may be opened at any time with no mechanical connection being necessary between the duct and blower. Thus, when the door is closed, the lower end of the upwardly extending duct comes into registry with the outlet duct of the blower.

Moreover, the outlet duct sections which are adjustably positioned along the length of the duct include novel simple adjusting means whereby the air flow from the duct which is to come out of the particular outlet can be simply adjusted by means of a plate which extends more or less into the main duct to thereby divert more or less air into the duct outlet.

Accordingly, a primary object of this invention is to provide a novel cooling system for cabinets.

Another object of this invention is to provide a novel air duct for electronic cabinets wherein outlet openings may be adjustably provided at any chassis location.

Another object of this invention is to provide a novel inexpensive cooling duct for electronic cabinets.

A further object of this invention is to provide a novel air duct for electronic cabinets which can be mounted on the door of the cabinet and moves into registry with a corresponding output duct from the blower.

A further object of this invention is to provide a novel outlet arrangement for cooling ducts wherein the quantity of air to be derived from the outlet can be easily and simply adjusted.

Another object of this invention is to provide a novel duct for cooling electronic cabinets wherein the position of outlets along the duct can be easily adjusted.

These and other objects of my invention will become apparent from the following description when taken in connection with the drawings, in which:

FIGURE 1 is a perspective rear view of a cabinet which is to receive racks of electronic equipment arranged vertically above one another.

FIGURE 2 is a front view of the cabinet of FIGURE 1 with one chassis in position and the rear door closed.

FIGURE 3 is a front view of the duct system and blower of the cabinet of FIGURES 1 and 2.

FIGURE 4 is a side view of FIGURE 3.

FIGURE 5 is an exploded perspective view of a portion of the duct of FIGURES 1 through 4 with a portion of an outlet unit or a blank cover which is to be fastened to the duct.

FIGURE 6 is a top view of FIGURE 5 after the blank cover is secured without requiring tools to the duct body.

FIGURE 7 is a side view partially broken away of an outlet unit which can be secured to the duct of FIGURES 1 through 6.

FIGURE 8 is a front view of the outlet unit of FIGURE 7.

FIGURE 8a is a top view of the unit of FIGURE 8.

FIGURE 9 is a similar to FIGURE 7 and illustrates the manner in which the outlet unit of FIGURE 7 may be adjusted for maximum air flow through the outlet unit.

Referring first to FIGURES 1 and 2, I have illustrated therein a cabinet 10 which, as seen in FIGURE 1, has a rear door 11 secured thereto. The cabinet 10 is adapted to receive vertically stacked chassis of electronic equipment. By way of example, in FIGURE 2, I have illustrated a chassis 12 secured to the mounting channels of the cabinet in any desired manner. It is necessary that the chassis of equipment such as chassis 12 have a flow of cooling air thereover to assure proper operation of the units.

To this end, a source of cooling air formed, for example, of a blower is contained within a blower housing 13 at the bottom of the cabinet 10 (although it could be arranged at the top of the cabinet) and brings air in through the front of the cabinet through a grill 14. The blower within housing 13 is connected to blower outlet duct 15, as best seen in FIGURES 1 and 4.

The duct outlet 15 comes into registry with the open lower end of air duct 16 secured to door 11 when the door 11 is closed. This registering position is shown in FIGURE 4. Air is, therefore, conducted from the blower within housing 13 up through the duct 16 to be distributed in an appropriate manner across chassis of electronic equipment such as chassis 12. A suitable louver 12a can be formed on chassis 12 to permit flow of air therethrough, or air can flow over the top of chassis 12 to cool the chassis housing and thus the interior thereof.

The duct 16, as shown in FIGURES 3 and 4, may have a number of duct openings which correspond to the position of banks of equipment. In FIGURES 3 and 4, five outlet positions are illustrated.

The duct 16 (FIGURE 5) is formed of a U-shaped cross-section body 17, which is formed of any appropriate sheet metal, the ends of which are bent outward more than 180° over, as illustrated by portions 18 and 19 which run along the complete length of the duct. Duct length is any multiple of the national standard for electronic panels, as required.

To form the completed duct, appropriately dimensioned outlet section and blank sections may be manually secured to U-shaped body 17. For example, in FIGURES 5 and 6, I have illustrated a blank section 20 which is formed of sheet metal of the type used in body 17, the sides of which are inwardly turned, as illustrated by inwardly turned sides 21 and 22. The dimensions of body 17 and blank 20 are such that the inwardly turned ends 21 and 22 will engage the outwardly turned ends 18 and 19 of body 17 in a snap-type engagement, as illustrated in FIGURE 6. Thus, the blank 20 can be snapped into position with relation to body 17, and be rigidly maintained in that position. The outlet units to be described more fully hereinafter are formed wth the same inwardly turned ends, such as ends 21 and 22 of blank 20, so that the snap engagement can be achieved for the outlet units as well as the blank plates.

The outlet units and blank sections are formed with lengths in multiples which conform to the national standard for heights of electronic chassis and blank panels as normally mounted at the front of these cabinets. Thereby the entire surface of body 17 is covered either by an outlet unit or a blank section.

The outlet units are best seen in FIGURES 7, 8, 8a and 9 as being comprised of a sheet metal body 30 which has an opening 31 therein which is, for example, formed by the upwardly bent tongue 32.

The upwardly bent tongue 32 has a slot 33 therein, as seen in FIGURE 8a, which receives a wing-nut 34 and 35 which secure a U-shaped strap of sheet metal 36. The U-shaped strap of sheet metal 36 can, therefore, be moved into and out of the duct body when wing-nut 34 is loosened so that it extends inwardly into the duct to any desired degree. Thus, the position of U-shaped body 36 will determine the amount of flow to be taken through outlet opening 31 and, thus, across the electronic chassis in registry with opening 31 within the cabinet.

In FIGURE 7, the member 36 protrudes only slightly into the duct so that only a relatively small amount of air is taken from the main path upwardly within the duct. In FIGURE 9, however, the member 36 is pushed completely into the duct so that the full air flow coming from the lower portions of the duct are discharged through duct opening 31.

As previously mentioned, the novel duct can be formed of blanks and outlet units of a standard dimension to give the appropriate spacing of the outlet units. For example, and in FIGURES 3 and 4, the duct is formed of five outlets 60, 61, 62, 63 and 64. Each of outlets 60 through 64 are formed in the exact same manner as illustrated for the outlets of FIGURES 7, 8 and 9, and are merely snapped into position over the duct base, such as base 17 of FIGURE 5.

The remaining sections of the duct are then filled in by blanks 65, 66, 67 and 68 which are of standard dimensions to fill the spaces between the various outlets. These blanks are, of course, formed in the manner shown for blank 20 of FIGURES 5 and 6, and are merely snapped into position. It is to be noted that the entire duct can be assembled without the requirement for tools, and that the arrangement of the outlet ducts can be easily modified to meet the requirements of the cabinet and the chassis positions within the cabinet. Rearrangement of chassis in the field is easily matched by realignment of outlets and blank covers.

Although I have described preferred embodiments of my novel invention, many variations and modifications will now be obvious to those skilled in the art, and I prefer therefore to be limited not by the specific disclosure herein but only by the appended claims.

I claim:

1. A cooling duct for electronic cabinets; said cooling duct comprising an elongated rear section having a U-shaped cross-section; the open side of said U-shaped cross-section receiving outlet duct sections and blank sections having formations thereon for connection in snap-type relation whereby the position of said outlet duct section is adjustably located along the length of said duct; said outlet duct section having a duct opening in the front surface thereof and an adjusting plate extending substantially perpendicularly to the direction of air flow through said duct; adjustable connection means for adjustably securing said adjusting plate to said outlet section; said adjusting plate extending along the edge of said duct opening which is downstream of the flow of air through said duct; said adjusting plate being movable along a straight line into and out of said duct to adjust the flow of air from said duct opening; said outlet duct section having an upwardly bent tongue extending therefrom to form said duct opening; said adjustable connection means connecting said adjusting plate to said tongue.

2. An adjustable duct outlet; said adjustable duct outlet comprising an outlet duct section having a duct opening in the front surface thereof and an adjusting plate; said adjusting plate being secured in an adjustable position to said outlet section and extending along the edge of said duct opening which is downstream of the flow of air through said duct; said adjusting plate being adjustably positioned along a straight line into and out of said duct to adjust the flow of air from said duct opening; a bolt means; said adjusting plate being lockable in an adjusted position by said bolt means extending from said plate to said outlet duct section; said outlet duct section having a tongue extending therefrom parallel to said plate; said bolt means engaging said outlet duct section along said tongue; said tongue being upwardly bent to form said duct opening.

3. A cooling system for an electronic cabinet; said electronic cabinet comprising wall portions, a removable door portion extending between said wall portions, and a plurality of support means in said cabinet vertically spaced apart for supporting a plurality of electrical chassis devices; said cooling system including air circulating means secured to the bottom of said electronic cabinet and a duct means secured to the interior of said removable door portion of said cabinet and terminating short of the bottom of said removable door portion; said circulating means having an upwardly curved outlet duct section terminating in a plane which includes the bottom of said duct means on said removable door portion of said cabinet; said bottom of said duct means having a cross section similar to the cross section of the end of said outlet duct section; the bottom of said duct means registering with the top of said outlet duct section when said removable door portion of said cabinet is closed; said duct means having a plurality of outlets spaced along the length thereof in registry with respective electrical chassis devices of said plurality of electrical chassis devices.

References Cited in the file of this patent

UNITED STATES PATENTS

| | | |
|---|---|---|
| 1,592,618 | Browne | July 13, 1926 |
| 2,087,640 | Lefebvre Du Prey | July 20, 1937 |
| 2,104,394 | Halbleib | Jan. 4, 1938 |
| 2,216,075 | Henderson | Sept. 24, 1940 |
| 2,403,072 | Gates | July 2, 1946 |
| 2,430,759 | Crise | Nov. 11, 1947 |
| 2,825,500 | McLean | Mar. 4, 1958 |
| 2,863,606 | Tatsch | Dec. 9, 1958 |